(12) United States Patent
Porter et al.

(10) Patent No.: US 10,808,936 B2
(45) Date of Patent: Oct. 20, 2020

(54) INTERRUPTED MIDRAIL FOR COMBUSTOR PANEL

(71) Applicant: United Technologies Corporation, Farmington, CT (US)

(72) Inventors: Steven D Porter, Wethersfield, CT (US); John T Ols, Northborough, MA (US); Fumitaka Ichihashi, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 230 days.

(21) Appl. No.: 16/020,736

(22) Filed: Jun. 27, 2018

(65) Prior Publication Data

US 2020/0003423 A1  Jan. 2, 2020

(51) Int. Cl.
*F23R 3/50* (2006.01)
*F23R 3/06* (2006.01)
*F23R 3/00* (2006.01)

(52) U.S. Cl.
CPC ............... *F23R 3/50* (2013.01); *F23R 3/002* (2013.01); *F23R 3/06* (2013.01); *F23R 2900/03042* (2013.01); *F23R 2900/03044* (2013.01)

(58) Field of Classification Search
CPC .... F23R 3/50; F23R 3/06; F23R 3/002; F23R 3/04; F23R 3/42; F23R 2900/03042; F23R 2900/03044
See application file for complete search history.

(56) References Cited

U.S. PATENT DOCUMENTS

| 6,701,714 | B2 * | 3/2004 | Burd ..................... F23M 5/02 60/752 |
| 9,416,970 | B2 | 8/2016 | Kirsopp et al. |
| 2013/0251513 | A1 * | 9/2013 | Stastny ............... B23K 1/0018 415/175 |
| 2015/0323182 | A1 * | 11/2015 | Sandoval ................. F23R 3/02 60/752 |
| 2016/0201909 | A1 * | 7/2016 | Bangerter ................. F02C 7/12 60/772 |
| 2017/0159935 | A1 * | 6/2017 | Drake ..................... F01D 25/12 |

FOREIGN PATENT DOCUMENTS

EP    3330611    6/2019

OTHER PUBLICATIONS

European Patent Office, European Search Report dated Sep. 6, 2019 in Application No. 19182920.9.

* cited by examiner

*Primary Examiner* — Steven M Sutherland
(74) *Attorney, Agent, or Firm* — Snell & Wilmer L.L.P.

(57) ABSTRACT

A heat shield panel for a gas turbine engine combustor may comprise a perimetrical rail extending at least partially around a perimeter of the heat shield panel and defining a main backside cavity, a plurality of air admittance holes, each air admittance hole extending along a hole axis, and a midrail dividing the main backside cavity into a first backside cavity and a second backside cavity, wherein at least a portion of the midrail is axially offset from at least one of the hole axes.

20 Claims, 12 Drawing Sheets

INTERRUPTED MIDRAIL FOR COMBUSTOR PANEL

FIELD

The present disclosure relates to combustors for gas turbine engines and, more particularly, to a heat shield panel arrangement for use in double wall gas turbine combustors.

BACKGROUND

Gas turbine engines, such as those used to power modern commercial aircraft, include a compressor for pressurizing a supply of air, a combustor for burning a hydrocarbon fuel in the presence of the pressurized air, and a turbine for extracting energy from the resultant combustion gases. In aircraft engine applications, the compressor, combustor and turbine are disposed about a central engine axis with the compressor disposed axially upstream of the combustor and the turbine disposed axially downstream of the combustor.

An exemplary combustor features an annular combustion chamber defined between a radially inward liner and radially outward shell extending aft from a forward bulkhead. The radially inward liner forms a heat shield. The radially outward shell extends circumferentially about and is radially spaced from the inward liner. Arrays of circumferentially distributed air admittance holes penetrate the outward shell and the inward liner at multiple axial locations along the length of the combustion chamber. Cooling air passes through the holes in the outer shell and then again through the holes in the inner liner, and finally into the combustion chamber. A plurality of circumferentially distributed fuel injectors and associated air passages are mounted in the forward bulkhead. The fuel injectors project into the forward end of the combustion chamber to supply the fuel. The associated air passages impart a swirl to inlet air entering the forward end of the combustion chamber at the bulkhead to provide rapid mixing of the fuel and inlet air.

Combustion of the hydrocarbon fuel in air typically produces oxides of nitrogen (NOx). NOx emissions are the subject of increasingly stringent controls by regulatory authorities. One combustion strategy for reducing NOx emissions from gas turbine engines is referred to as rich burn, quick quench, lean burn (RQL) combustion. The RQL combustion strategy recognizes that the conditions for NOx formation are most favorable at elevated combustion flame temperatures, i.e. when the fuel-air ratio is at or near stoichiometric. A combustor configured for RQL combustion includes three serially arranged combustion zones: a fuel-rich combustion zone at the forward end of the combustor, a quench or dilution zone that involves the conversion of rich combustion to lean combustion, and a lean combustion zone axially aft of the quench or dilution zone. Thus, the combustion process in a combustor configured for RQL combustion has two governing states of combustion: a first state in the forward portion of the combustor that is stoichiometrically fuel-rich and a second state in a downstream portion of the combustor that is stoichiometrically fuel-lean.

During engine operation with RQL combustion, pressurized air from the compressor enters the combustion chamber radially through a row of circumferentially spaced dilution air admission holes. The additional air admitted through these dilution air holes mixes with the combustion products from the first zone to support further combustion and release additional energy from the fuel. The air also progressively deriches the fuel rich combustion gases as these gases flow axially through and mix with the air introduced in the quench region. Initially, with the dilution air addition, the fuel-air ratio of the combustion products becomes less fuel rich approaching a stoichiometric composition, causing an attendant rise in the combustion flame temperature.

SUMMARY

A heat shield panel for a gas turbine engine combustor is disclosed, comprising a perimetrical rail extending at least partially around a perimeter of the heat shield panel and defining a main backside cavity, a plurality of air admittance holes, each air admittance hole extending along an associated hole axis, and a midrail dividing the main backside cavity into a first backside cavity and a second backside cavity, wherein at least a portion of the midrail is axially offset from at least one of the hole axes.

In various embodiments, the perimetrical rail comprises a first side rail, a second side rail disposed opposite the heat shield panel from the first side rail, a forward rail extending from the first side rail to the second side rail, and an aft rail extending from the first side rail to the second side rail and disposed opposite the heat shield panel from the forward rail.

In various embodiments, the midrail extends from the first side rail to the second side rail.

In various embodiments, the midrail comprises a first rail portion and a second rail portion axially spaced from the first rail portion.

In various embodiments, the midrail intersects at least one of the plurality of air admittance holes.

In various embodiments, the midrail comprises an arcuate geometry extending between a first air admittance hole and a second air admittance hole.

In various embodiments, the heat shield panel further comprises a segregator rail disposed between the aft rail and the midrail and in close proximity to an aft end of the heat shield panel, wherein the segregator rail extends from the first side rail to the second side rail substantially parallel with the aft rail.

In various embodiments, the heat shield panel comprises a first surface and a second surface opposite the heat shield panel from the first surface, wherein the perimetrical rail and the midrail extend from the first surface.

A heat shield panel for a gas turbine engine combustor is disclosed, comprising a perimetrical rail extending at least partially around a perimeter of the heat shield panel and defining a main backside cavity, a plurality of air admittance holes, each air admittance hole extending along an associated hole axis, and a midrail dividing the main backside cavity into a first backside cavity and a second backside cavity, wherein the midrail extends circumferentially between a first air admittance hole and a second air admittance hole and is axially spaced from the hole axes.

In various embodiments, the perimetrical rail comprises a first side rail, a second side rail disposed opposite the heat shield panel from the first side rail, a forward rail extending from the first side rail to the second side rail, and an aft rail extending from the first side rail to the second side rail and disposed opposite the heat shield panel from the forward rail.

In various embodiments, the midrail extends from the first side rail to the second side rail.

In various embodiments, the heat shield panel further comprises a segregator rail disposed between the aft rail and the midrail and in close proximity to an aft end of the heat shield panel, wherein the segregator rail extends from the first side rail to the second side rail substantially parallel with the aft rail.

In various embodiments, the midrail comprises an annular portion defining the first air admittance hole.

A combustor module for a gas turbine engine is disclosed, comprising an annular liner assembly extending along a longitudinal axis, the annular liner assembly comprising an annular support shell and a plurality of heat shield panels coupled to the annular support shell, the plurality of heat shield panels forming a segmented ring defining a plurality of axial seams therebetween, wherein the plurality of heat shield panels comprises a first heat shield panel comprising a perimetrical rail extending at least partially around a perimeter of the first heat shield panel and defining a main backside cavity between the first heat shield panel and the annular support shell, a plurality of air admittance holes, each air admittance hole extending along an associated hole axis, and a midrail dividing the main backside cavity into a first backside cavity and a second backside cavity, wherein at least a portion of the midrail is axially offset from at least one of the hole axes.

In various embodiments, the perimetrical rail comprises a first side rail, a second side rail disposed opposite the first heat shield panel from the first side rail, a forward rail extending from the first side rail to the second side rail, and an aft rail extending from the first side rail to the second side rail and disposed opposite the first heat shield panel from the forward rail.

In various embodiments, the midrail extends from the first side rail to the second side rail.

In various embodiments, the midrail comprises a first rail portion and a second rail portion axially spaced from the first rail portion.

In various embodiments, the midrail intersects at least one air admittance hole of the plurality of air admittance holes.

In various embodiments, the midrail comprises an arcuate geometry extending between a first air admittance hole and a second air admittance hole.

In various embodiments, the midrail comprises an annular portion defining the first air admittance hole.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

A heat shield panel as disclosed herein comprises a midrail. The midrail may be situated on the heat shield panel to minimize the risk of rail strike during cooling hole manufacturing, thus increasing the robustness and integrity of the midrail and tending to prevent cooling air from leaking between backside cavities. A heat shield panel as disclosed herein may allow for more cooling holes to be drilled in hot areas of the heat shield panel while having the midrail segregate backside panel cavities. A heat shield panel as disclosed herein may allow for more cooling holes to be drilled between air admittance holes where hot spots may occur.

Figure 1:
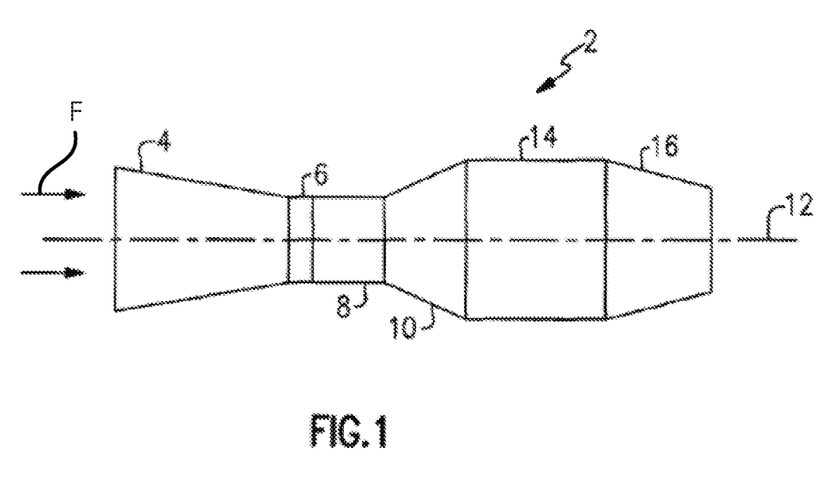
FIG. 1 is a schematic view of a gas turbine engine according to various embodiments of the present disclosure, in accordance with various embodiments.

With reference to FIG. 1 of the drawings, a conventional gas turbine engine 2 generally includes a compressor module 4, a diffuser section 6, a combustor module 8, and a turbine module 10. The modules are disposed about a central longitudinal axis 12 which constitutes the centerline of the gas turbine engine. Gas flow through the gas turbine engine 2 is indicated generally by arrow F. Some gas turbine engines, such as those used in military applications, include an afterburner section 14 and a nozzle 16. On the other hand, some gas turbine engines such as those used large commercial jet liners of contemporary design include a high bypass ratio fan module forward of the compressor module 4. It should be noted that small engines may have radial or centrifugal compressors, rather than axial compressors.

Figure 2:
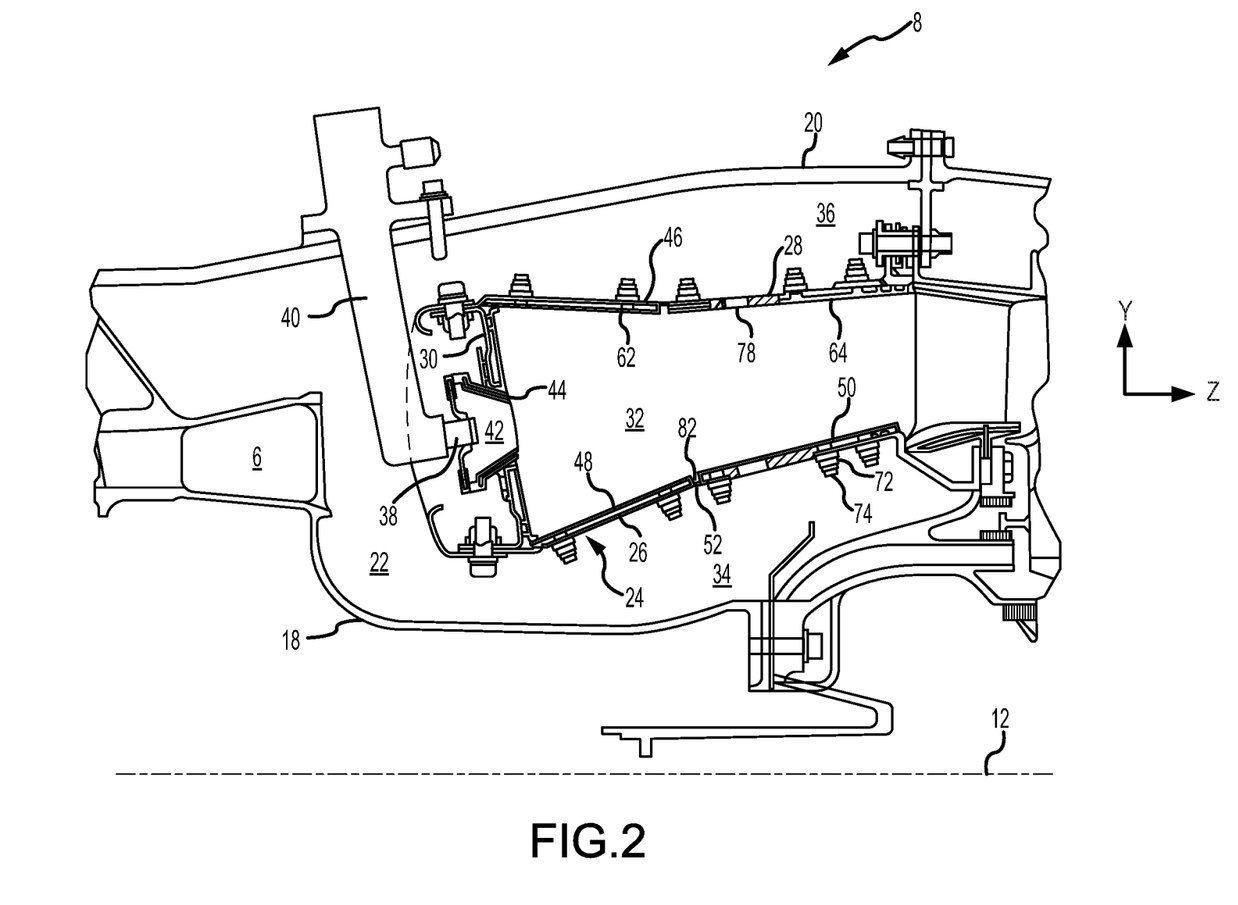
FIG. 2 is a schematic diagram of the combustor module of FIG. 1, in accordance with various embodiments.
Figure 3:
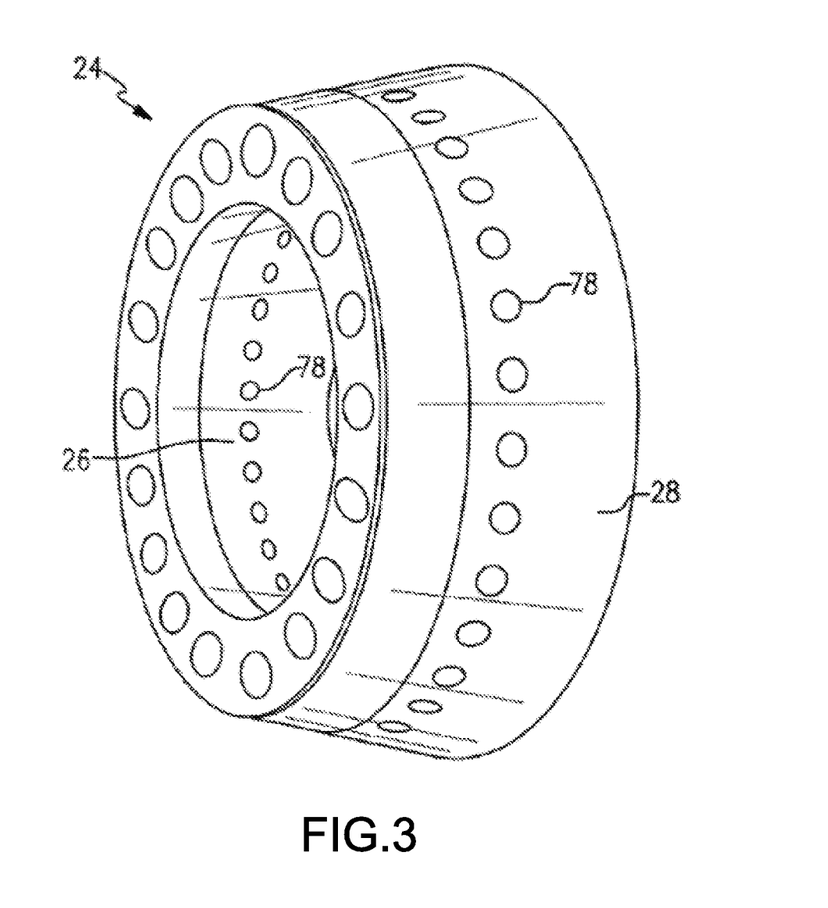
FIG. 3 is a perspective view of the combustor of FIG. 1, in accordance with various embodiments.

With reference to FIG. 2 and FIG. 3, the exemplary combustor module 8 includes a radially inner case 18 and a radially outer case 20 concentric with and circumscribing the inner case, which in cooperation define an annular pressure vessel 22 concentric with the engine axis 12. An annular combustor 24 is disposed within the annular pressure vessel 22. The combustor 24 has a liner assembly that includes a radially inner liner assembly 26 circumscribing an axially extending engine axis 12, a radially outer liner assembly 28 that circumscribes the inner liner assembly 26 in generally coaxial spaced relationship therewith, and a bulkhead 30 extending between the respective forward ends of the inner liner assembly 26 and the outer liner assembly 28. Collectively, the inner liner assembly 26, the outer liner assembly 28, and the forward bulkhead 30 bound an annular combustion chamber 32. The inner liner assembly 26 cooperates with the inner case 18 to define an inner air plenum 34, and the outer liner assembly 28 cooperates with the outer case 20 to define an outer air plenum 36.

The combustor 24 may have a forward section wherein the inner and outer liners converge from fore to aft and an aft section wherein the inner and outer liner converge fore to aft more gradually than the forward section. However, the depicted combustor configuration is exemplary and not limiting of the disclosure. For example, the combustor 24 may have a forward section wherein the inner and outer liners extend aft in parallel relationship and an aft section wherein the inner and outer liner converge fore to aft. In other configurations, the inner and outer liners may be parallel over the entire length of the liner assembly, or the liners may converge in a forward section and then extend parallel in an aft section, or the liners may converge in both the forward and aft sections at the same or different angles of convergence throughout, or the liners may assume geometrically differing profiles in cross-section. The forward bulkhead 30 carries a plurality of fuel nozzles 38, for example typically from twelve (12) to twenty-four (24) depending upon the size of the engine, disposed in a circumferential array at spaced intervals about the annular combustion chamber 32. Each fuel nozzle 38 is disposed at the end of a support 40 which extends through the outer case 20 to convey fuel from an external source to the associated fuel nozzle. Each of the fuel nozzles 38 injects fuel through a spray head into a central stream of air emitted along the centerline of the fuel nozzle. An air passage 42 which may have a swirler 44 associated therewith as depicted in the exemplary embodiment, is operatively associated with each of the fuel nozzles 38. Pressurized air from the compressor module 4 is directed through the diffuser section 6 into the inner air plenum 34 and the outer air plenum 36 defined within the annular pressure vessel 22. A portion of this pressured air passes into the combustion chamber 32 through the air passage 42. Each swirler 44 imparts a spin to the air passing therethrough to provide rapid mixing of this air with the fuel being injected through each of the associated fuel nozzles 38.

With continued reference to FIG. 2 and FIG. 3, in the exemplary embodiment the inner liner assembly 26 and the outer liner assembly 28 are structured with a support shell and associated heat shield panels. The outer liner assembly 28 may comprise a single-piece outer support shell 46 fastened to the outer case 20, and the heat shields may be formed as a circumferential array of arcuate heat shield panels. In various embodiments, heat shield panels may be excluded in one of the liner assemblies. For example, an alternate construction may comprise a single-wall outer liner and an inner liner assembly comprising a support shell and heat shield panels.

Figure 4:
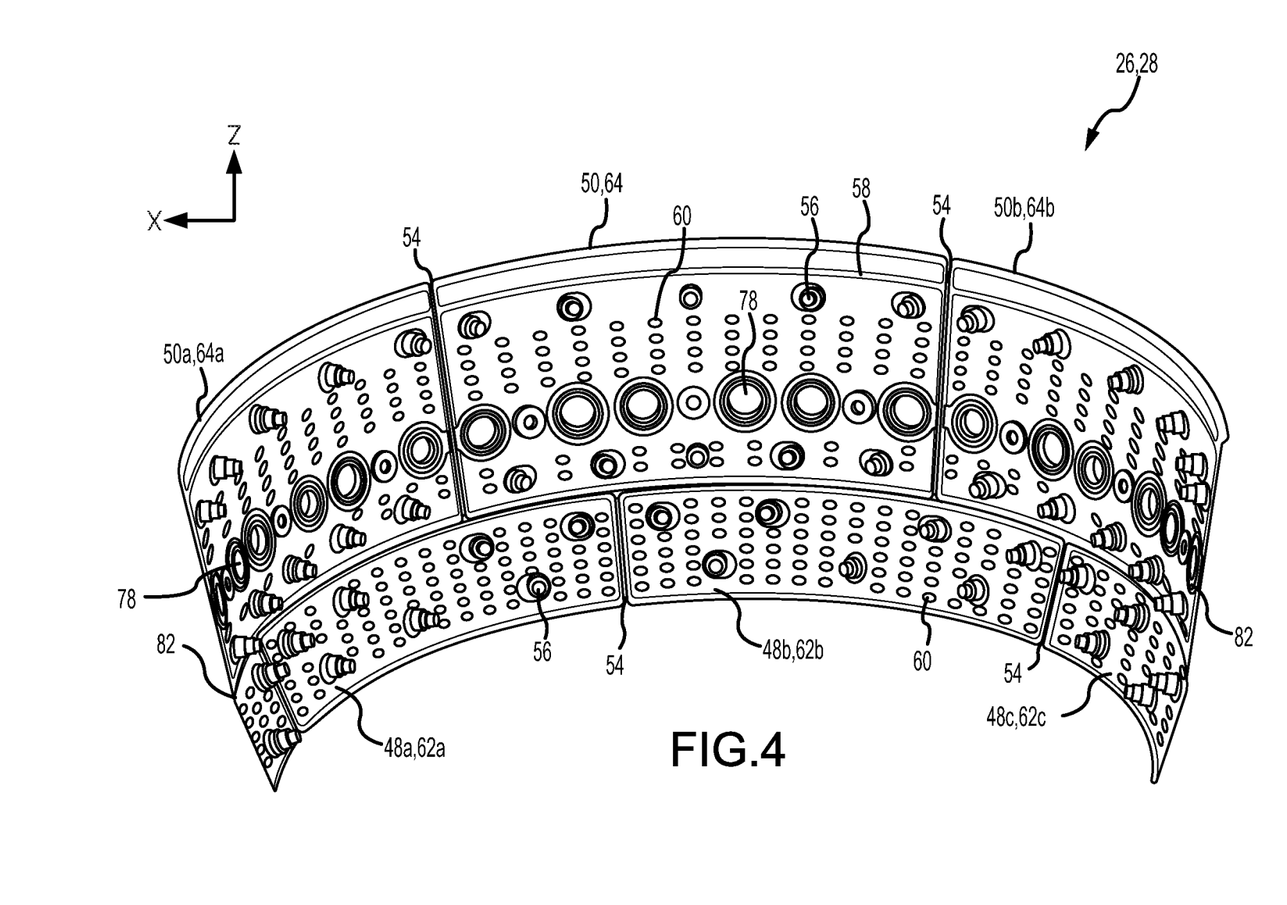
FIG. 4 is a schematic representation of the alignment of the forward heat shield panels with the aft heat shield panels, in accordance with various embodiments.

With reference to FIG. 2 and FIG. 4, shown is an exemplary embodiment of the heat shield panel arrangement for the inner liner assembly 26. An array of forward inner heat shield panels 48 and an array of aft inner heat shield panels 50 line the hot side of an inner support shell 52. Referring to FIG. 4, wherein the inner support shell 52 is removed for clarity, the forward and aft inner heat shield panels 48, 50 form a segmented ring defining a plurality of axial seams 54 therebetween. The forward inner heat shield panels 48a, 48b, and 48c include a plurality of mounting posts 56 through which studs pass. The exemplary aft inner heat shield panels 50a, 50b similarly include mounting posts 56. The aft inner heat shield panel 50 further includes a plurality of rails 58. The rails 58 serve to create pockets for supplying cooling air when the heat shield panel is mated to the support shell. The pockets meter cooling air through a plurality of film cooling holes 60 in the heat shield panel to provide film cooling to the hot surfaces of the heat shield panels. The film cooling holes 60 are typically about 0.025 inches (0.64 mm) in diameter.

Still referring to FIG. 4, the heat shield panel arrangement for the outer liner assembly 28 may have a similar construction. An array of forward outer heat shield panels 62 and an array of aft outer heat shield panels 64 line the hot side of the outer support shell 46. The outer support shell 46 is removed for clarity.

In various embodiments, liner assemblies 26, 28 that include forward heat shield panels 48, 62 and aft heat shield panels 50, 64 define a circumferential seam 82 between the forward and aft segmented rings. The circumferential seams 82 are typically approximately 0.040-0.080 inches wide (1.02-2.03 mm) in the cold assembled state, and close down to approximately 0.020 inches or less (0.51 mm) during gas turbine engine operation, wherein the term approximately in this regard may mean plus or minus 0.02 inches (±0.508 mm) in accordance with various embodiments.

Figure 5:
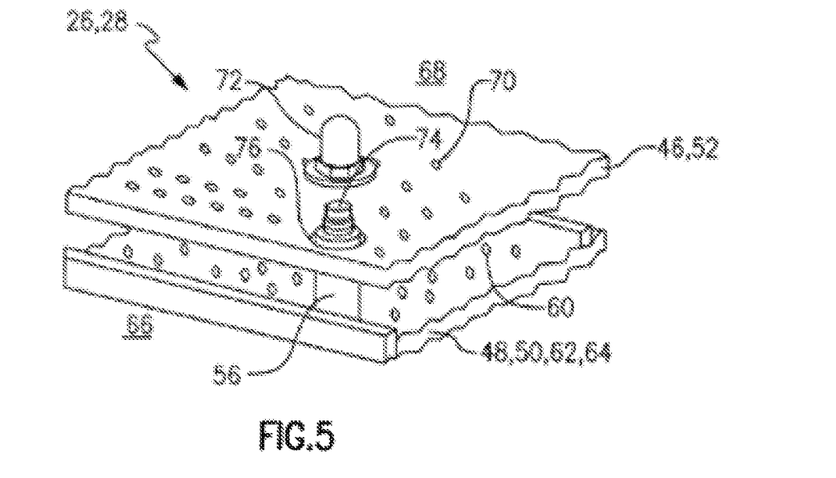
FIG. 5 is an elevation view, partly in section, of a sector of the liner assembly of FIG. 2, in accordance with various embodiments.

Referring to FIG. 5, shown is an exemplary heat shield panel 48, 50, 62, 64 mated to a corresponding support shells 46, 52 defining a hot side 66 and a cold side 68 of the liner assembly 26, 28. As shown in FIGS. 2, 4, and 5, impingement cooling holes 70 penetrate through the support shells 46, 52 from the inner and outer air plenum 34, 36 respectively, to allow cooling air to enter the space between the inner and outer support shells and the respective heat shield panels. The plurality of film cooling holes 60 penetrate each of the heat shield panels 48, 50, 62, and 64, to allow cooling air to pass from the cold side 68 of the panel to the hot side 66 of the panel and to promote the creation of a film of cooling air over the hot side of each panel. A plurality of nuts 72 and studs 74 may be used to fasten each of the heat shield panels to the respective support shells 46, 52.

In various embodiments, the heat shield panels are thermally de-coupled from the support shells to which they are fastened. That is, during operation the panels thermally expand and contract without imposing mechanical stress on the support shells. The exemplary support shell 46, 52 may include clearance holes 76 through which the mounting posts 56 pass. The clearance holes 76 are sized with sufficient clearance so as to allow the heat shield panel to thermally expand without creating an interference. One of the clearance holes 76 in each panel is sized to provide a line-on-line fit with a corresponding pin at assembly. In this manner, the respective heat shield panel is fixed at a single point only to the support shell and is permitted to thermally expand about the single point.

Referring now back to FIG. 4, the inner and outer liner assembly 26, 28 further include a plurality of circumferentially spaced air admittance holes 78, also referred to as a quench holes or dilution holes. Combustion air flowed through the air admittance holes 78 serves not only as secondary air to provide additional oxygen for completion of combustion on the partially-combusted combustion product gases, but also as quench mixing air to cool the main flow of partially-combusted combustion product gases for reducing high temperature regions, that is hot spots, within the combustion product gases for the dual purposes of controlling the formation of oxides of nitrogen and of providing a more uniform temperature profile in the combustion product gases exiting the combustor to pass through the turbine of the gas turbine engine.

Figure 6A:
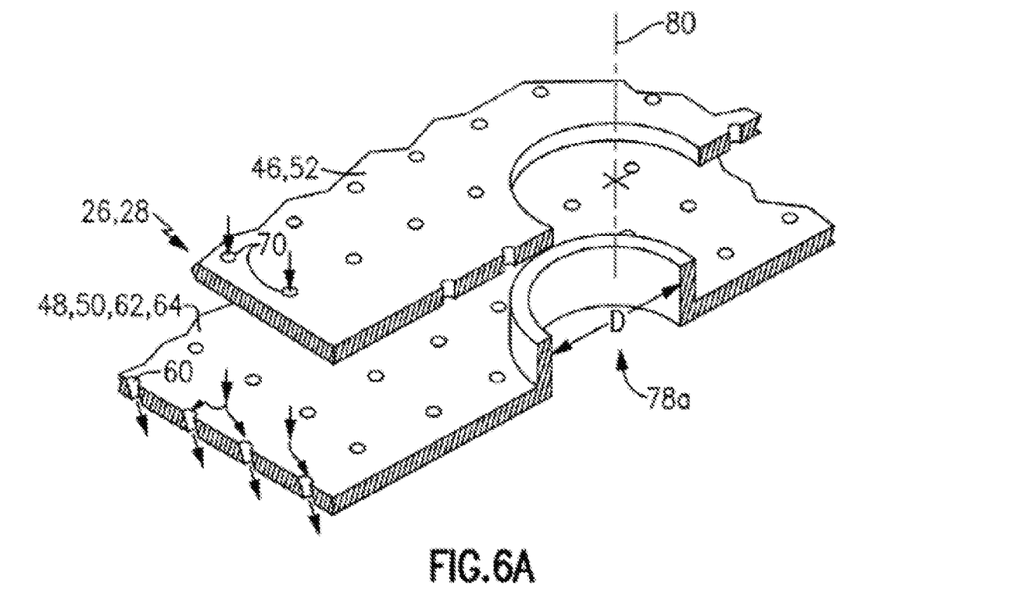
FIG. 6A and FIG. 6B are additional elevation views, partly in section, of a sector of the liner assembly of FIG. 2, in accordance with various embodiments.

Referring to FIG. 6A, the air admittance hole 78 has a diameter D. In some examples, the air admittance hole 78 may be elliptical or oval in shape, in which case D is taken as the mean diameter. In one example wherein the combustor 24 is arranged in a gas turbine engine for a commercial airliner, the diameter D is greater than 0.4 inches (1.27 cm). The air admittance hole 78 extends along a hole axis 80, which is generally in a radial direction. However, in some examples the hole axis 80 may be offset from the radial axis by about 10 degrees. In other examples, the hole axis 80 may be offset from the radial axis up to about 30 degrees.

Figure 6B:
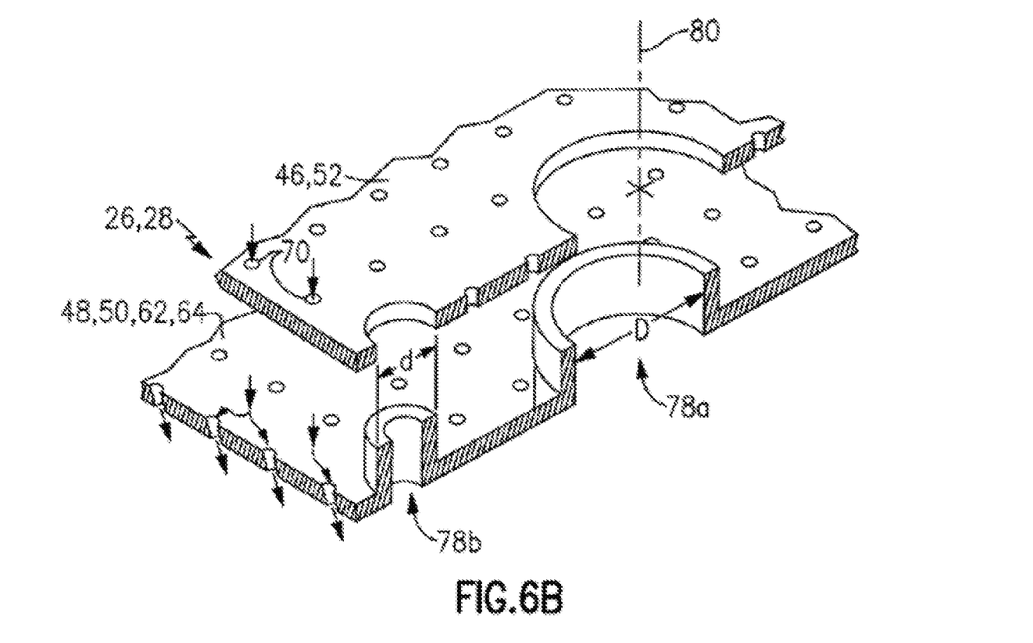

The circumferential pattern of air admittance holes 78 may also include a pattern of secondary, smaller diameter holes. Referring to FIG. 6B, in the exemplary embodiment of the depicted combustor 24, the liner assembly 26, 28 has a plurality of large diameter air admittance holes 78a having a diameter D, and a plurality of smaller diameter air admittance holes 78b having a diameter d. The plurality of second air admittance holes 78b are shown arranged in between the large diameter air admittance holes 78a. However, depending upon the particular design of the combustor 24, alternate arrangements are possible. In the example given above, the diameter is typically less than 0.375 inches (0.95 cm).

In the depicted embodiment shown in FIGS. 6A and 6B, the plurality of air admittance holes 78 are arranged on the aft heat shield panels 50, 64. However, depending upon the particular design of the combustor 24, the air admittance holes 78 may also be arranged on the forward heat shield panels 48, 62.

Figure 7:
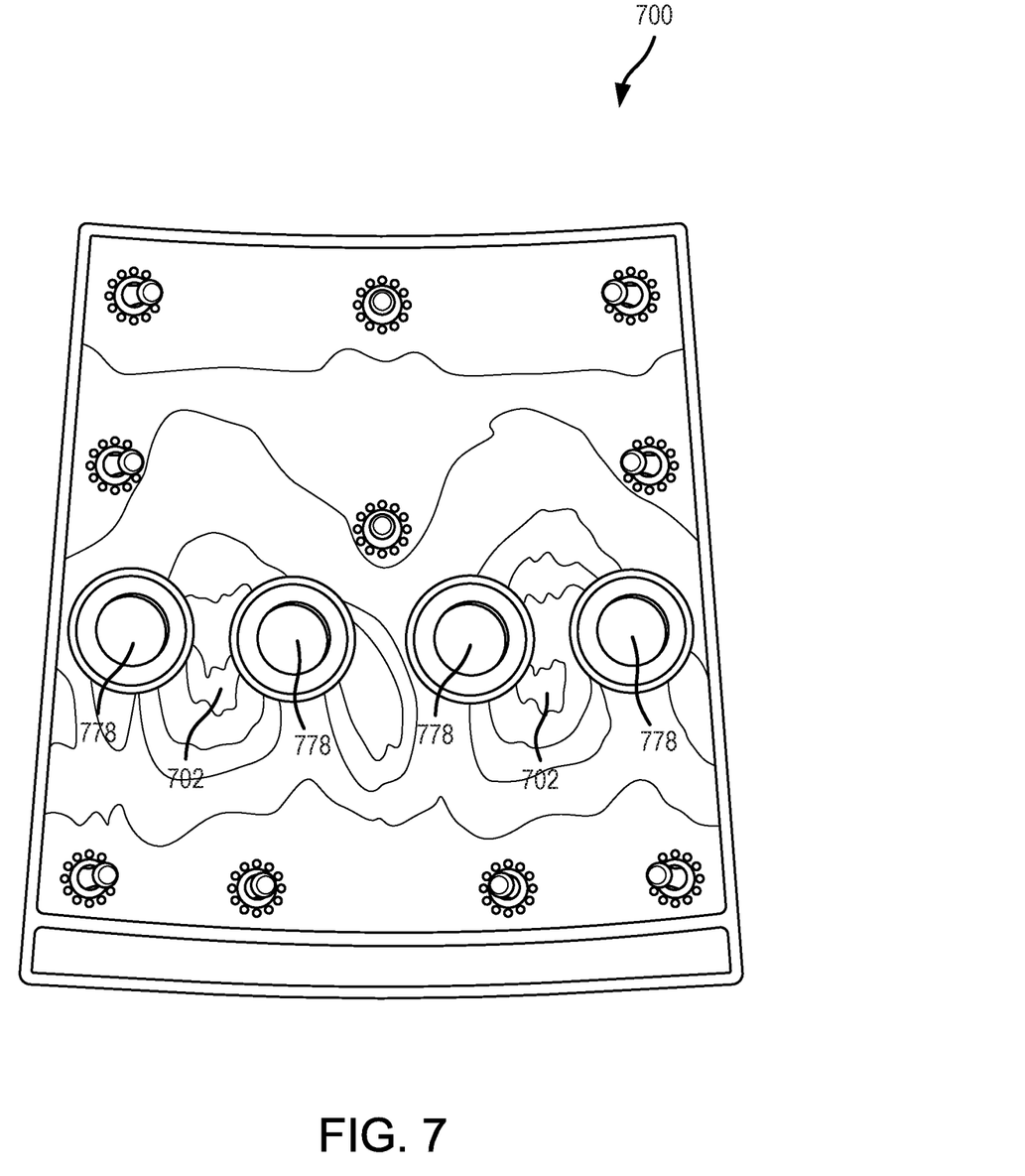
FIG. 7 is a contour plot of the temperature of a heat shield panel, in accordance with various embodiments.

With reference to FIG. 7, a contour plot of the temperature of an aft heat shield panel 700 during engine operation is illustrated, in accordance with various embodiments. During operation of an engine, an aft heat shield panel 700 may develop hot spots 702 in close proximity to air admittance holes 778. The hot spots 702 may form between two air admittance holes 778. In this regard, it may be desirable to dispose a plurality of cooling holes (e.g., see film cooling holes 60 in FIG. 6A) at the locations where hot spots 702 tend to form. Furthermore, it may be desirable to dispose an increased number of plurality of cooling holes at the locations where hot spots 702 tend to form relative to other locations of the aft heat shield panel 700.

Figure 8:
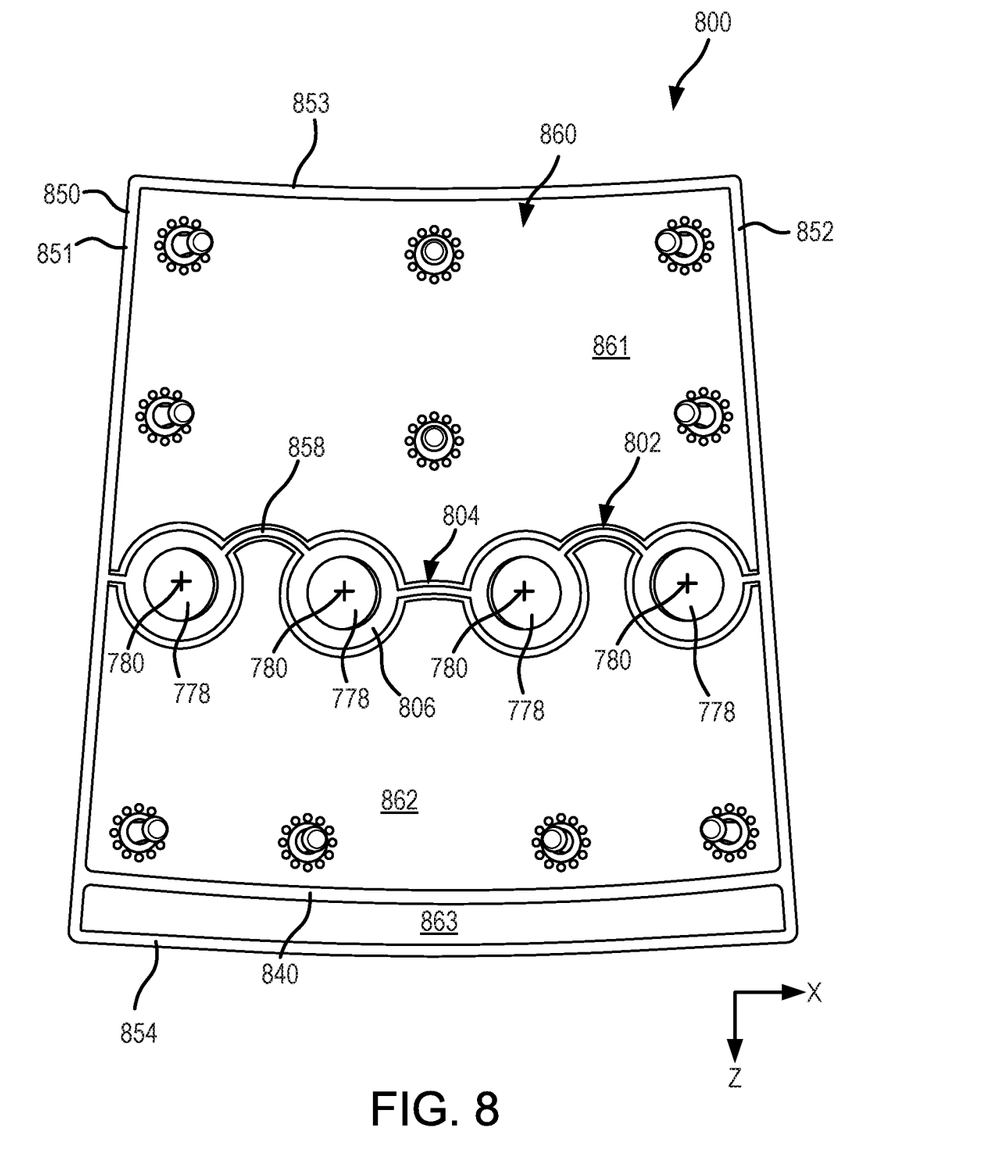
FIG. 8, FIG. 9, and FIG. 10 are heat shield panels having a midrail, in accordance with various embodiments.

With reference to FIG. 8, a heat shield panel 800 is illustrated, in accordance with various embodiments. Heat shield panel 800 may comprise a perimetrical rail 850 comprising a first side rail 851, a second side rail 852 disposed opposite the heat shield panel 800 from the first side rail 851, a forward rail 853 extending from the first side rail 851 to the second side rail 852, and an aft rail 854 extending from the first side rail 851 to the second side rail 852 and disposed opposite the heat shield panel 800 from the forward rail 853. Perimetrical rail 850 may define a main backside cavity 860. Perimetrical rail 850 may extend around the perimeter of heat shield panel 800. In various embodiments, perimetrical rail 850 extends around the entire perimeter of heat shield panel 800. In various embodiments, perimetrical rail 850 may be segmented such that perimetrical rail 850 extends around the perimeter of heat shield panel 800, but having one or more small breaks or discontinuities therein. In this regard, it may be said that perimetrical rail 850 extends at least partially around the perimeter of heat shield panel 800, wherein in accordance with various embodiments the perimetrical rail 850 extends continuously around the entire perimeter of heat shield panel 800 or in accordance with various embodiments the perimetrical rail 850 extends in one or more segments around one or more portions of the perimeter of heat shield panel 800. Heat shield panel 800 may comprise a midrail 858 extending between the first side rail 851 and the second side rail 852 and dividing the main backside cavity 860 into a first backside cavity 861 and a second backside cavity 862. Heat shield panel 800 and midrail 858 may be formed as a single, monolithic piece.

Midrail 858 may be routed between first side rail 851 and second side rail 852 in a manner to avoid hot spots 702 (see FIG. 7). By disposing midrails to not intersect hot spots 702 (see FIG. 7), and therefore locations where an increased number of cooling holes may be desired, the integrity of the midrails may not be compromised during manufacturing of the cooling holes. Stated differently, by disposing midrail 858 to be axially offset from hole axes 780, the integrity of the midrails may be preserved during manufacturing of the cooling holes.

Figure 11A:
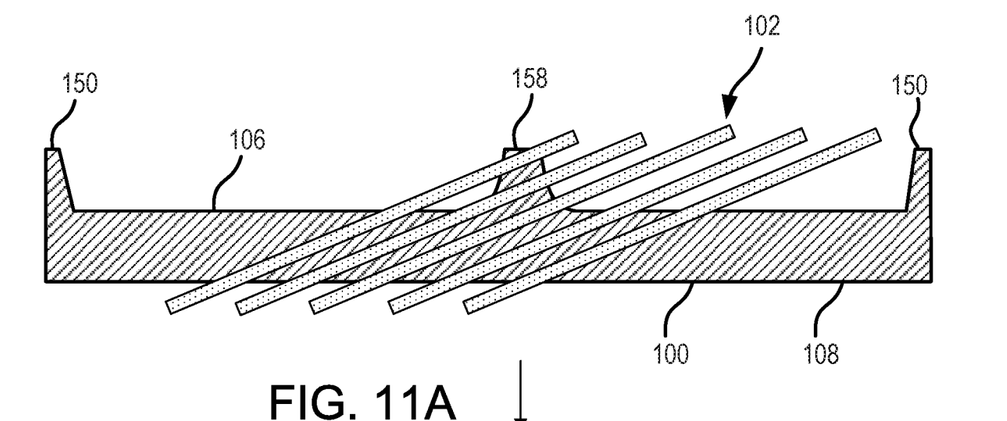
FIG. 11A is a cross-section view of a laser drilling process for cooling holes in a heat shield panel having a midrail disposed at a hotspot location, in accordance with various embodiments.
Figure 11B:
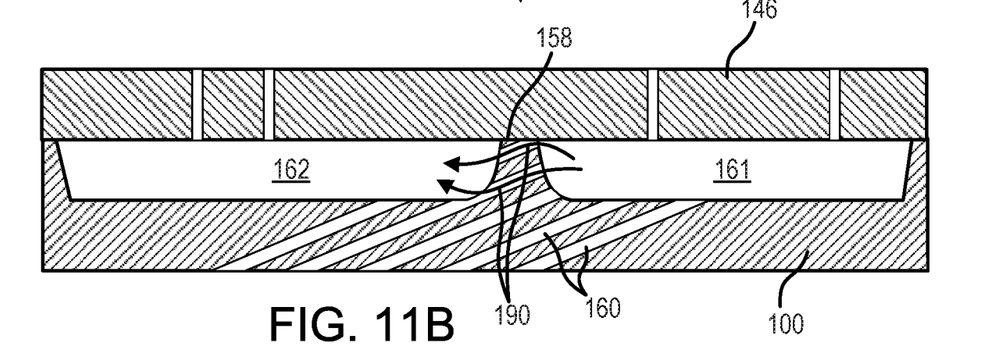
FIG. 11B is a cross-section view of the heat shield panel of FIG. 11A installed onto a support shell, in accordance with various embodiments.
Figure 11C:
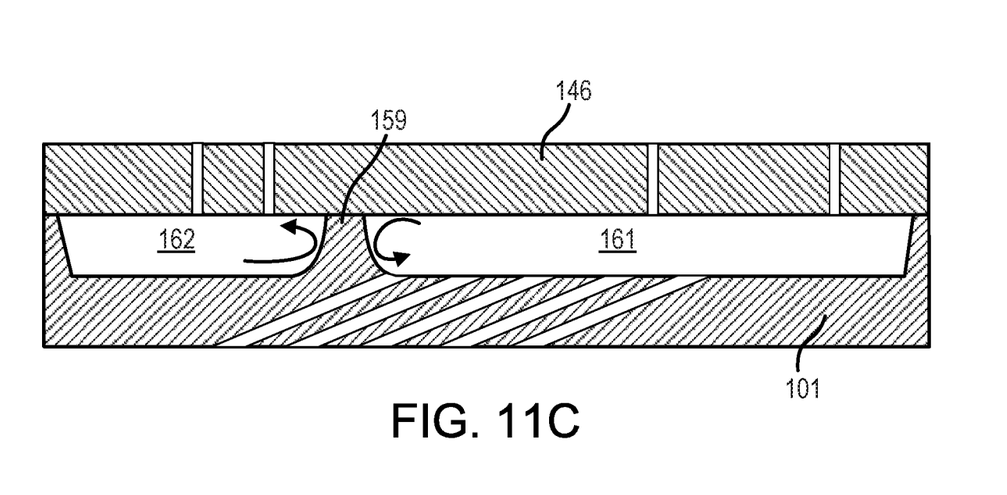
FIG. 11C is a cross-section view of a heat shield panel having a midrail routed away from a plurality of cooling holes at a hotspot location and installed onto a support shell, in accordance with various embodiments.

For example, with reference to FIG. 11A and FIG. 11B, a laser drilling process for manufacturing a plurality of film cooling holes into a heat shield 100 having a midrail 158 at the location of the plurality of film cooling holes is illustrated, in accordance with various embodiments. The laser drilling process may be performed from a first surface 106 of the heat shield 100 or a second surface 108 of the heat shield. Midrail 158 and perimetrical rail 150 may at least partially define first backside chamber 161 and second backside chamber 162. One or more lasers 102 may be used for forming the film cooling holes 160. In various embodiments, the one or more lasers 102 may undesirably form film cooling holes 160 extending through the midrail 158 in response to the midrail 158 being at the location where the film cooling holes 160 are formed. In this regard, when heat shield 100 is installed onto a support shell 146, the first backside chamber 161 may be in fluid communication with second backside chamber 162 whereby cooling air (see arrows 190) may freely travel between the first and second backside chambers 161, 162, reducing the effect of the midrail 158. In this regard, it may be difficult to maintain a pressure differential between the two chambers 161, 162 in response to the cooling holes 160 extending through the midrail. Furthermore, the structural integrity of the midrail 158 may be compromised in response to the cooling holes 160 extending therethrough. With reference to FIG. 11C, by moving the midrail 159 to a location having a reduced number of cooling holes, rail strike (i.e., lasers striking the midrail) may be reduced or minimized. Furthermore, separation between the first backside chamber 161 and the second backside chamber 162 may be maintained.

Although described with respect to a laser drilling process, cooling holes 160 may be similarly manufactured using a water-jet manufacturing process, among other suitable manufacturing processes.

With reference now to FIG. 8, each air admittance hole 778 may comprise a hole axis 780. In various embodiments, at least a portion of the midrail 858 is axially offset from the hole axes 780. In various embodiments, midrail 858 extends from first side rail 851 to second side rail 852. The midrail 858 may comprise a first rail portion and a second rail portion axially spaced from the first rail portion. For example, in various embodiments, a first rail portion 802 is axially offset (in the Z-direction) from a second rail portion 804. In various embodiments, the midrail 858 intersects at least one of the air admittance holes 778. For example, the midrail 858 may comprise annular portions 806 surrounding one or more air admittance holes 778. In various embodiments, midrail 858 comprises an arcuate geometry (e.g., see at first rail portion 802) extending between a first air admittance hole 778 and a second air admittance hole 778.

In various embodiments, heat shield panel 800 may further comprise a segregator rail 840 disposed between the aft rail 854 and the midrail 858 and in close proximity to the aft rail 854. The segregator rail 840 may extend from the first side rail 851 to the second side rail 852. The segregator rail 840 may be substantially parallel with the aft rail 854. In various embodiments, segregator rail 840 defines an aft backside cavity 863.

Figure 9:
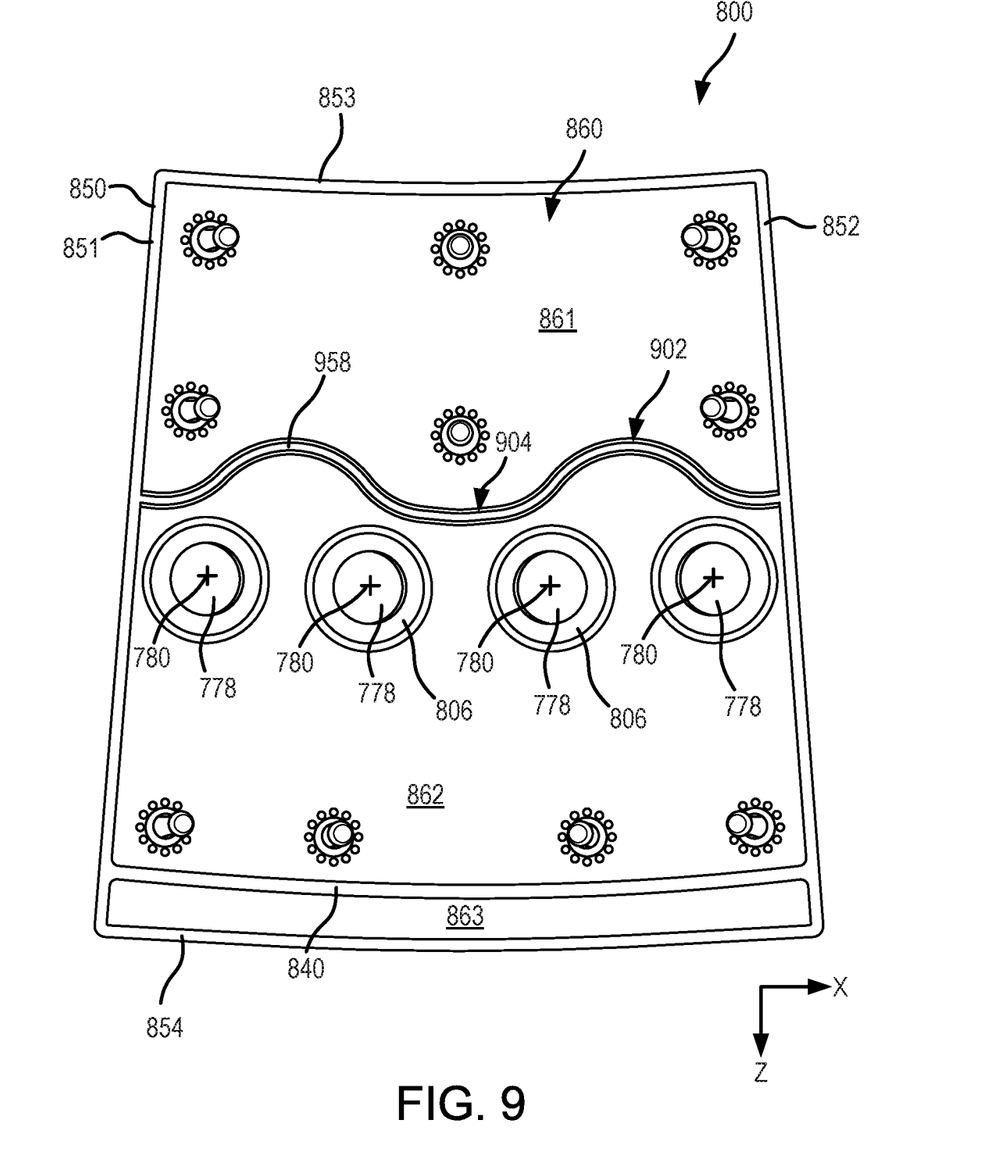

With respect to FIG. 9, elements with like element numbering, as depicted in FIG. 8, are intended to be the same and will not necessarily be repeated for the sake of clarity.

With reference to FIG. 9, heat shield panel 800 may comprise a midrail 958 extending between the first side rail 851 and the second side rail 852 without intersecting annular portions 806 of air admittance holes 778. Midrail 958 may comprise a first portion 902 routed away from air admittance holes 778 and a second portion 904 routed towards air admittance holes 778. In this manner, midrail 958 may avoid locations where an increased number of cooling holes may be located.

Figure 10:
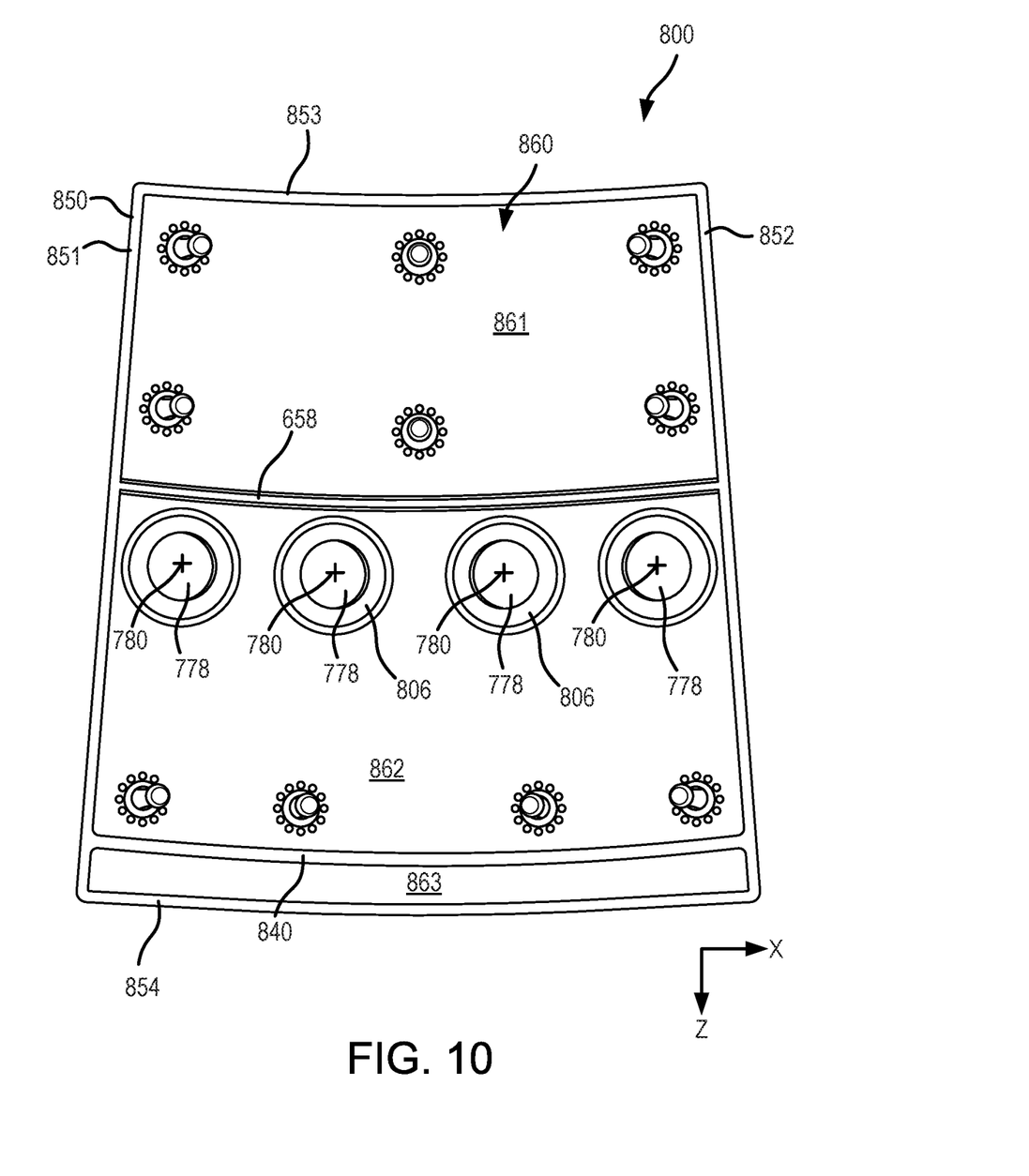

With respect to FIG. 10, elements with like element numbering, as depicted in FIG. 8, are intended to be the same and will not necessarily be repeated for the sake of clarity.

With reference to FIG. 10, heat shield panel 800 may comprise a midrail 658 extending between the first side rail 851 and the second side rail 852 without intersecting annular portions 806 of air admittance holes 778. In various embodiments, midrail 658 extends linearly between first side rail 851 and the second side rail 852. In various embodiments, midrail 658 extends uniformly between first side rail 851 and the second side rail 852. Midrail 658 may be disposed between annular portions 806 of air admittance holes 778 and forward rail 853.

Figure 12:
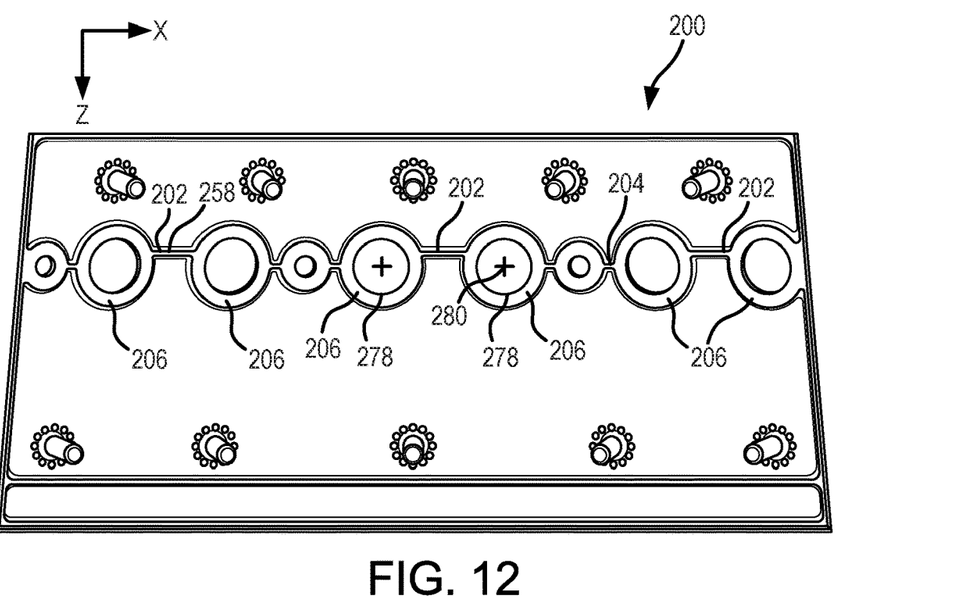
FIG. 12 and FIG. 13 are heat shield panels having a midrail, in accordance with various embodiments.

With reference to FIG. 12, a heat shield panel 200 is illustrated, in accordance with various embodiments. Heat shield panel 200 may comprise a midrail 258. Midrail 258 may comprise a plurality of annular portions 206 defining a plurality of corresponding air admittance holes 278. Midrail 258 may comprise one or more segments 202 extending between corresponding annular portions 206. The one or more segments 202 may be axially offset (in the Z-direction) from a hole axis 280 of the air admittance holes 278. In various embodiments, the one or more segments 202 may be axially offset in the forward direction (i.e., negative Z-direction) from the hole axis 280. In various embodiments, the one or more segments 202 may be linear. In various embodiments, midrail 258 may comprise one or more segments 204 extending between annular portions 206 and offset from the one or more segments 202.

Figure 13:
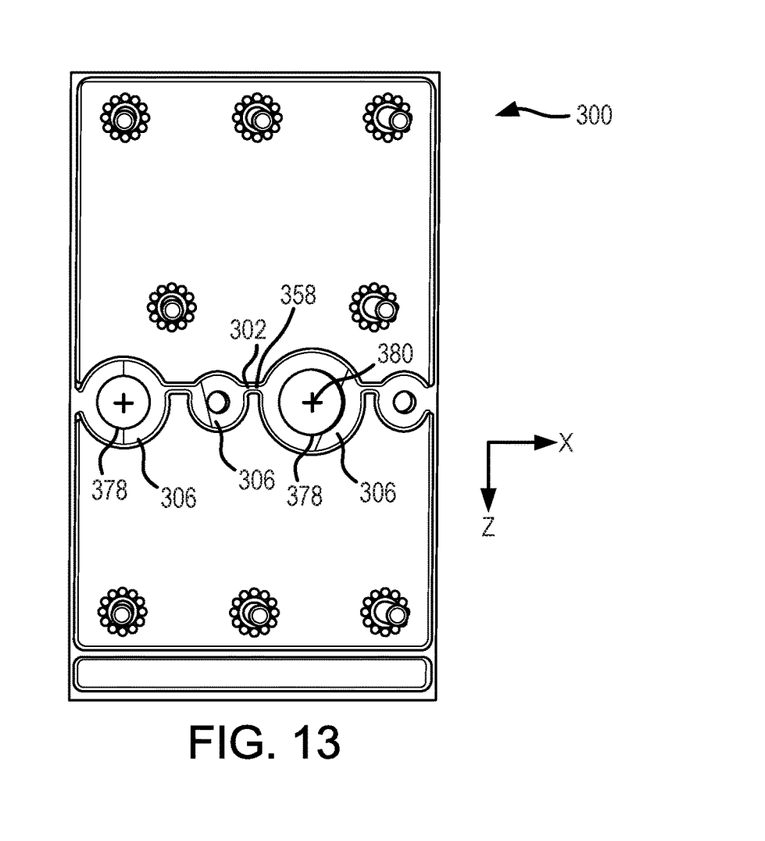

With reference to FIG. 13, a heat shield panel 300 is illustrated, in accordance with various embodiments. Heat shield panel 300 may comprise a midrail 358. Midrail 358 may comprise a plurality of annular portions 306 defining a plurality of corresponding air admittance holes 378. Midrail 358 may comprise one or more segments 302 extending between corresponding annular portions 306. In various embodiments, midrail 358 comprises segments 302 extending circumferentially between a first annular portion 306 and a second annular portion 306 which are axially spaced (i.e., offset in the Z-direction) from hole axes 380.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield panel for a gas turbine engine combustor, comprising:
   a backside surface;
   a perimetrical rail extending at least partially around a perimeter of the heat shield panel and defining a main backside cavity;
   a first air admittance hole disposed in the backside surface and comprising a first hole axis;
   a second air admittance hole disposed in the backside surface and comprising a second hole axis; and
   a midrail extending from the backside surface and dividing at least in-part the main backside cavity into a first backside cavity and a second backside cavity, wherein the midrail comprises a first rail portion extending from the first air admittance hole to the second air admittance hole, wherein the first rail portion of the midrail is axially offset from at least one of the first hole axis and the second hole axis such that the second backside cavity is disposed at least in-part at a location directly between the first hole axis and the second hole axis.

2. The heat shield panel of claim 1, wherein the perimetrical rail comprises a first side rail, a second side rail disposed opposite the heat shield panel from the first side rail, a forward rail extending from the first side rail to the second side rail, and an aft rail extending from the first side rail to the second side rail and disposed opposite the heat shield panel from the forward rail.

3. The heat shield panel of claim 2, wherein the midrail extends from the first side rail to the second side rail.

4. The heat shield panel of claim 2, further comprising a segregator rail disposed between the aft rail and the midrail and in close proximity to an aft end of the heat shield panel, wherein the segregator rail extends from the first side rail to the second side rail substantially parallel with the aft rail, the segregator rail at least partially defining an aft backside cavity.

5. The heat shield panel of claim 1, wherein the midrail comprises a second rail portion axially spaced from the first rail portion.

6. The heat shield panel of claim 1, wherein the first rail portion comprises an arcuate geometry.

7. The heat shield panel of claim 1, wherein the heat shield panel comprises a second surface opposite the heat shield panel from the backside surface, wherein the perimetrical rail and the midrail extend from the backside surface.

8. The heat shield panel of claim 1, wherein the midrail further comprises:
   a first annular portion surrounding the first air admittance hole; and
   a second annular portion surrounding the second air admittance hole,
   wherein the first rail portion extends from the first annular portion to the second annular portion.

9. A heat shield panel for a gas turbine engine combustor, comprising:
   a perimetrical rail extending at least partially around a perimeter of the heat shield panel and defining a main backside cavity;
   a first air admittance hole disposed in the heat shield panel and comprising a first hole axis;
   a second air admittance hole disposed in the heat shield panel and comprising a second hole axis; and
   a midrail dividing the main backside cavity into a first backside cavity and a second backside cavity, wherein the midrail comprises a non-linear geometry and is axially offset at least one of upstream or downstream from at least one of the first hole axis and the second hole axis.

10. The heat shield panel of claim 9, wherein the perimetrical rail comprises a first side rail, a second side rail disposed opposite the heat shield panel from the first side rail, a forward rail extending from the first side rail to the second side rail, and an aft rail extending from the first side rail to the second side rail and disposed opposite the heat shield panel from the forward rail.

11. The heat shield panel of claim 10, wherein the midrail extends from the first side rail to the second side rail.

12. The heat shield panel of claim 10, further comprising a segregator rail disposed between the aft rail and the midrail and in close proximity to an aft end of the heat shield panel, wherein the segregator rail extends from the first side rail to the second side rail substantially parallel with the aft rail.

13. The heat shield panel of claim 9, wherein the midrail comprises an annular portion defining the first air admittance hole.

14. The heat shield panel of claim 4, wherein the segregator rail is disposed aft of an aft-most row of studs in the heat shield panel.

15. A combustor module for a gas turbine engine, comprising:
   an annular liner assembly extending along a longitudinal axis, the annular liner assembly comprising an annular support shell and a plurality of heat shield panels coupled to the annular support shell, the plurality of heat shield panels forming a segmented ring defining a plurality of axial seams therebetween;
   wherein the plurality of heat shield panels comprises a first heat shield panel comprising:
     a backside surface;
     a perimetrical rail extending at least partially around a perimeter of the first heat shield panel and defining a main backside cavity between the first heat shield panel and the annular support shell;
     a first air admittance hole disposed in the backside surface and comprising a first hole axis;
     a second air admittance hole disposed in the backside surface and comprising a second hole axis; and
     a midrail extending from the backside surface and dividing at least in-part the main backside cavity into a first backside cavity and a second backside cavity, wherein the midrail comprises a first segment extending from the first air admittance hole to the second air admittance hole, wherein the first segment of the midrail is axially offset from at least one of the first hole axis and the second hole axis such that the second backside cavity is disposed at least in-part at a location directly between the first hole axis and the second hole axis.

16. The combustor module of claim 15, wherein the perimetrical rail comprises a first side rail, a second side rail disposed opposite the first heat shield panel from the first side rail, a forward rail extending from the first side rail to the second side rail, and an aft rail extending from the first side rail to the second side rail and disposed opposite the first heat shield panel from the forward rail.

17. The combustor module of claim 16, wherein the midrail extends from the first side rail to the second side rail.

18. The combustor module of claim 15, wherein the midrail comprises a second segment axially spaced from the first segment.

19. The combustor module of claim 15, wherein the midrail comprises an arcuate geometry extending between a first air admittance hole and a second air admittance hole.

20. The combustor module of claim 15, wherein the midrail comprises a first annular portion surrounding the first air admittance hole and a second annular portion surrounding the second air admittance hole.

* * * * *